United States Patent
May (10) Patent No.: US 8,849,724 B2
(45) Date of Patent: Sep. 30, 2014

(54) SHIPPING CONTAINER REUSE RECOMMENDATION SYSTEM

(75) Inventor: Lorin Catherine May, London (GB)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/342,019

(22) Filed: Dec. 31, 2011

(65) Prior Publication Data

US 2013/0173487 A1 Jul. 4, 2013

(51) Int. Cl.
*G06Q 30/00* (2012.01)
*G06Q 10/08* (2012.01)

(52) U.S. Cl.
CPC .......... *G06Q 10/0833* (2013.01); *G06Q 10/083* (2013.01)
USPC .......................................... 705/333; 705/330

(58) Field of Classification Search
CPC .......................... G06Q 10/0833; G06Q 10/083
USPC .................................................. 705/333, 330
See application file for complete search history.

(56) References Cited

U.S. PATENT DOCUMENTS

| | | | |
|---|---|---|---|
| 7,873,549 B1* | 1/2011 | Mishra et al. | 705/28 |
| 2008/0162297 A1* | 7/2008 | Hershkovitz et al. | 705/26 |
| 2009/0006164 A1* | 1/2009 | Kaiser et al. | 705/8 |
| 2010/0063887 A1* | 3/2010 | Kranz et al. | 705/17 |

OTHER PUBLICATIONS

Chism, Camille, Optimizing and Benchmarking Returnable Container Processes Within an Automotive Distribution System, Rochester Institute of Technology, Jul. 2010.*

* cited by examiner

*Primary Examiner* — Nathan Erb
(74) *Attorney, Agent, or Firm* — Schwegman, Lundberg & Woessner, P.A.

(57) ABSTRACT

A shipping container reuse recommendation system receives a shipping container identifier of a shipping container. The shipping container identifier of the shipping container is associated with a first transaction of an online marketplace application. The location of the shipping container is tracked. A database stores shipping container identifiers and corresponding transaction and tracking location histories. A recommendation to reuse a shipping container in a second transaction of the online marketplace application is generated based on a transaction and tracking location history associated with the shipping container identifier.

11 Claims, 7 Drawing Sheets

SHIPPING CONTAINER REUSE RECOMMENDATION SYSTEM

TECHNICAL FIELD

This application relates generally to the field of computer technology, and in a specific example embodiment, to a system and method for providing a recommendation to reuse a shipping container.

BACKGROUND

Shipping boxes are typically discarded after they are received. With the rise of electronic commerce, more shipping boxes are being produced and discarded. The majority of recipients discard their shipping boxes and packaging material to recycling services.

BRIEF DESCRIPTION OF THE DRAWINGS

The present description is illustrated by way of example, and not by way of limitation, in the figures of the accompanying drawings in which.

DETAILED DESCRIPTION

Although the embodiments have been described with reference to specific example embodiments, it will be evident that various modifications and changes may be made to these embodiments without departing from the broader spirit and scope of the description. Accordingly, the specification and drawings are to be regarded in an illustrative rather than a restrictive sense.

In various embodiments, a system and method for generating a recommendation to reuse a shipping container, such as a shipping box, is described. A shipping container reuse recommendation system receives a shipping container identifier of a shipping container. The shipping container identifier of the shipping container is associated with a first transaction of an online marketplace application. The location of the shipping container is tracked. A database stores shipping container identifiers and corresponding transaction and tracking location histories. A recommendation to reuse a shipping container in a second transaction of the online marketplace application is generated based on a transaction and tracking location history associated with the shipping container identifier.

In another embodiment, the system tracks a number of shipping transactions of a shipping container based on a shipping container identifier associated with the shipping container. The system then generates a recommendation to reuse the shipping container based on the number of shipping transactions.

In another embodiment, the system identifies a travel route, a number of destinations, and a number of connections corresponding to the shipping container based on the shipping container identifier. The system then generates a recommendation to reuse the shipping container based on the number of transactions, the travel route, the number of destinations, and the number of connections.

In another embodiment, the system detects a second transaction where a buyer identified in a first transaction of an online marketplace is identified as a seller in a second transaction of the online marketplace. The system then determines whether an item identified in the second transaction of the online marketplace fits in the shipping container from the first transaction. The system then generates a recommendation to reuse the shipping container from the first transaction for the second transaction when the item identified in the second transaction of the online marketplace fits in the shipping container.

Figure 1:
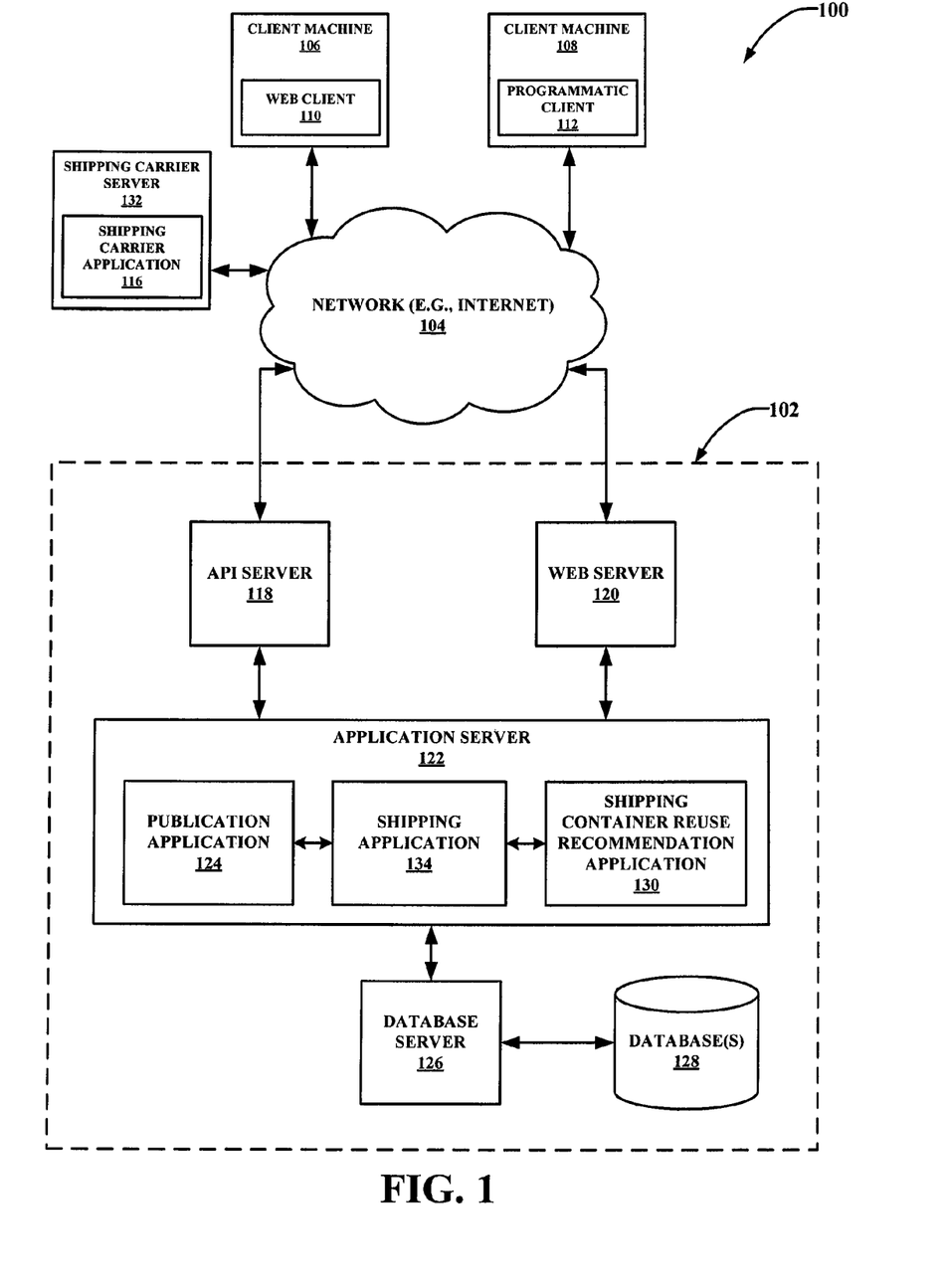
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a network-based publisher 102, where clients may communicate and exchange data within the network system 100. The data may pertain to various functions (e.g., online item purchases) and aspects (e.g., managing order information) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet), to one or more clients. The one or more clients may include users that utilize the network system 100 and, more specifically, the network-based publisher 102, to exchange data over the network 104. These transactions may include transmitting, receiving (communicating) and processing data to, from, and regarding content and users of the network system 100. The data may include, but are not limited to, content and user data such as order tracking information; alternative fulfillment data; feedback data; user reputation values; user profiles; user attributes; product and service reviews and information (such as pricing and descriptive information); product, service, manufacturer, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client (e.g., web browser) 110. The web client 110 may be in communication with the network-based publisher 102 via a web server 120. The UIs may also be associated with a client machine 108 using a programmatic client 112, such as a client application.

It can be appreciated that in various embodiments, the client machines 106 and 108 may be associated with a buyer, a seller, a third-party electronic commerce platform, and/or a payment service provider. The buyers and sellers may be any one of individuals, merchants, or service providers, among other things.

Furthermore, a shipping carrier server 132 of a shipping service provider may be in communication with the network-based publisher 102 and optionally with client machines 106 and 108. The shipping carrier server 132 includes a shipping carrier application 116 to provide a shipping tracking mechanism to the client machines 106 and 108 and the application server 122. The shipping tracking mechanism allows the client machines 106 and 108 and the application server 122 to determine the status and location of a shipment for an item associated with an order placed by a buyer.

Turning specifically to the network-based publisher 102, an application program interface (API) server 118 and a web server 120 are coupled to, and provide programmatic and web interfaces respectively to, one or more application servers 122. The application server 122 hosts a publication application 124, a shipping application 134, and a shipping container reuse recommendation application 130. The application server 122 is, in turn, shown to be coupled to one or more database server(s) 126 that facilitate access to one or more database(s) 128.

In one embodiment, the web server 120 and the API server 118 communicate about and receive data pertaining to listings, transactions, order tracking information, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., web client 110 or shipping carrier application 116) running on another client machine (e.g., shipping carrier server 132).

The publication application 124 may provide a number of publisher functions and services (e.g., listing, payment, etc.) to users that access the network-based publisher 102. For example, the publication application 124 may provide a number of services and functions to users for listing goods and/or services for sale, facilitating transactions. In one embodiment, the publication application 124 includes an online marketplace.

The shipping application 134 may further provide a shipment status related to a transaction associated with a listing. For example, the shipping application 134 may communicate with the shipping carrier application 116 of the shipping carrier server 132 to determine a status or location of a shipped package containing an item related to a transaction associated with a listing of the publication application 124.

The shipping container reuse recommendation application 130 communicates with the publication application 124 and the shipping application 134 to generate a recommendation to a user to reuse a shipping container. Embodiments of the shipping container reuse recommendation application 130 are further described below.

Figure 2:
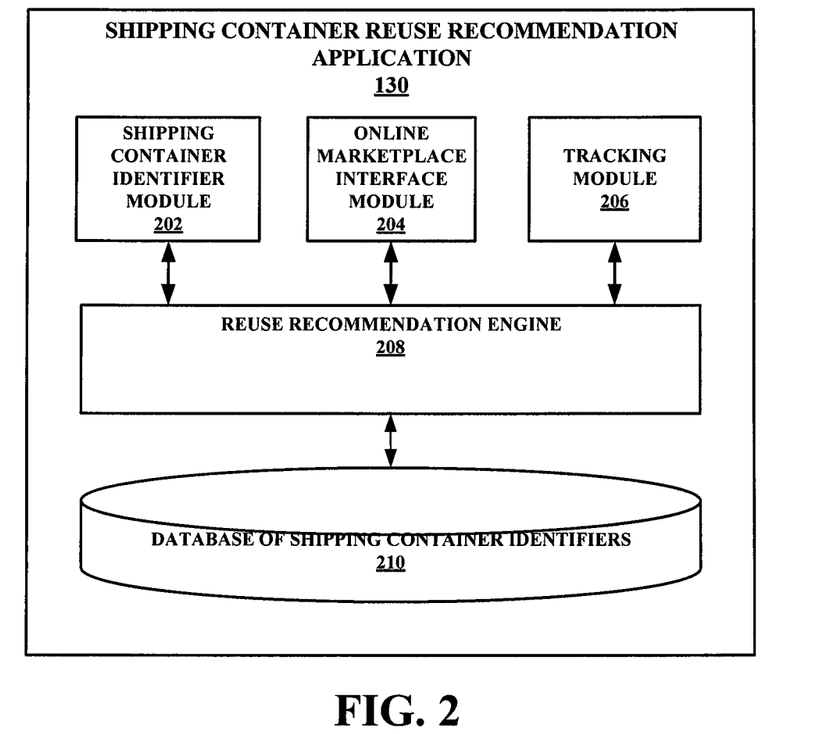
FIG. 2 is a block diagram illustrating an example embodiment of a shipping container reuse recommendation application.

FIG. 2 illustrates an example embodiment of the shipping container reuse recommendation application 130. The shipping container reuse recommendation application 130 includes a shipping container identifier module 202, an online marketplace interface module 204, a tracking module 206, a reuse recommendation engine 208, and a database of shipping container identifiers 210.

The shipping container identifier module 202 receives a shipping container identifier of a shipping container. The shipping container identifier may be, for example, a machine-readable code such as a bar code or QR code. In another example, the shipping container identifier may include a serial number. A user may scan the barcode on a shipping container, or may enter the serial number on the shipping container. The shipping container identifier is uniquely associated with the shipping container. For example, a sticker comprising a serial number of the box ID may be affixed to the shipping container.

The online marketplace interface module 204 communicates with the online marketplace from the publication application 124 (see FIG. 1) to associate the shipping container identifier of the shipping container with a first transaction of the online marketplace application. For example, a user may enter a serial number of a box ID corresponding to a transaction (buying or selling an item) corresponding to a listing in the online marketplace application.

The tracking module 206 tracks a location of the shipping container associated with the first transaction. In one embodiment, the tracking module 206 communicates with the shipping application 134 (see FIG. 1) to determine the location of the shipping container. In another embodiment, the tracking module 206 communicates with the shipping carrier server 132 (see FIG. 1) to determine the location of the shipping container.

Figure 3:
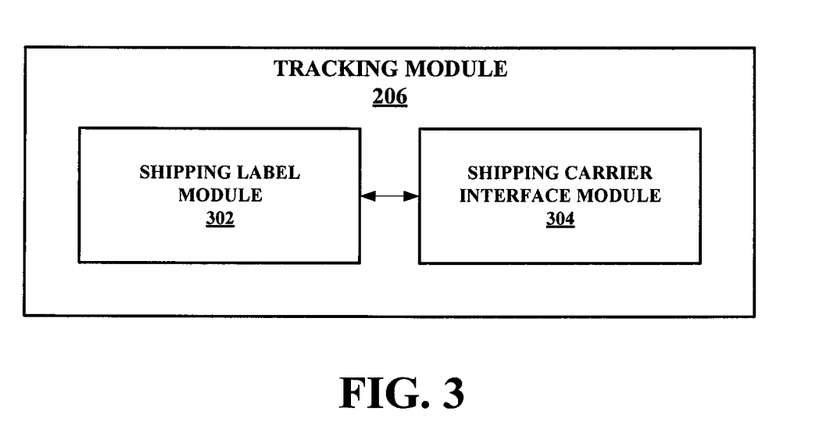
FIG. 3 is a block diagram illustrating an example embodiment of a tracking module.

FIG. 3 is a block diagram illustrating an example embodiment of a tracking module 206. In one embodiment, the tracking module 206 includes a shipping label module 302 and a shipping carrier interface module 304. The shipping label module 302 generates a shipping label that includes the shipping information, the shipping label to be affixed on the shipping container. The shipping carrier interface module 304 communicates with a shipping carrier server to determine the location of the shipping container based on the information in the shipping label.

Back to FIG. 2, the reuse recommendation engine 208 generates a recommendation to re-use the shipping container for a second transaction of the online marketplace application based on a transaction and tracking location history associated with the shipping container identifier.

The database of shipping container identifiers 210 stores a database of shipping container identifiers and corresponding transaction and tracking location histories, wherein the transaction comprises a seller's information, a buyer's information, an item description, and shipping information.

Figure 4:
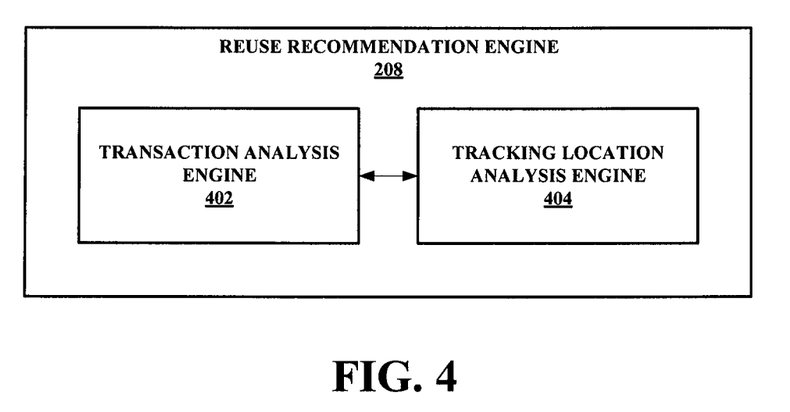
FIG. 4 is a block diagram illustrating an example embodiment of a reuse recommendation engine.

FIG. 4 is a block diagram illustrating an example embodiment of the reuse recommendation engine 208. The reuse recommendation engine 208 includes a transaction analysis engine 402 and a tracking location analysis engine 404.

The transaction analysis engine 402 determines a number of transactions of the online marketplace application associated with the shipping container identifier. For example, the serial number from a box ID may indicate that the box has been involved in five shipping transactions from the online marketplace.

The tracking location analysis engine 404 identifies a travel route, a number of destinations, and a number of connections corresponding to the shipping container based on the shipping container identifier. The travel route may include a travel path on a map of the shipping container. The number of destinations may include the number of times the box has been shipped and received. The number of connections may include the number of times the box has been in transit from one location to another, such as from one shipping warehouse to another shipping warehouse.

In one embodiment, the reuse recommendation engine 208 generates a recommendation to reuse the shipping container based on the number of transactions, the travel route, the number of destinations, and the number of connections.

Figure 5:
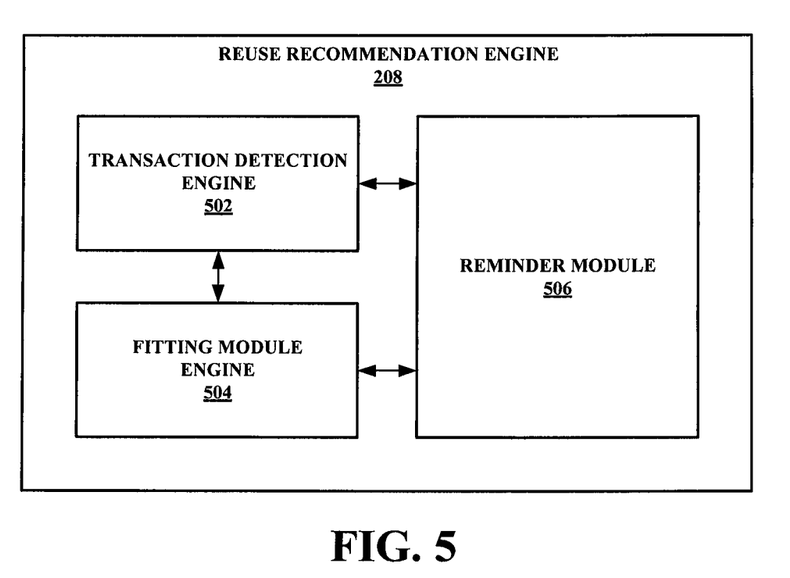
FIG. 5 is a block diagram illustrating another example embodiment of a reuse recommendation engine.

FIG. 5 is a block diagram illustrating another example embodiment of the reuse recommendation engine 208. The reuse recommendation engine 208 includes a transaction detection engine 502, a fitting module engine 504, and a reminder module 506.

The transaction detection engine 502 detects the second transaction where a buyer identified in the first transaction is identified as a seller in the second transaction. For example, once a buyer has received a box associated with a first transaction, the buyer in the first transaction may be identified as a seller in an unrelated second transaction.

The fitting module engine 504 determines whether an item identified in the second transaction fits in the shipping container from the first transaction. The fitting module engine 504 obtains the size information of the item from publication application 124 (see FIG. 1) and compares it with a size information of the shipping container. The database of shipping container identifiers 210 (see FIG. 2) may store the size information associated with each box using the box identifier.

The reminder module 506 generates a recommendation to reuse the shipping container from the first transaction for the second transaction. For example, the seller (previously buyer) is reminded to reuse the shipping container that he has received with respect to a previous transaction.

Figure 6:
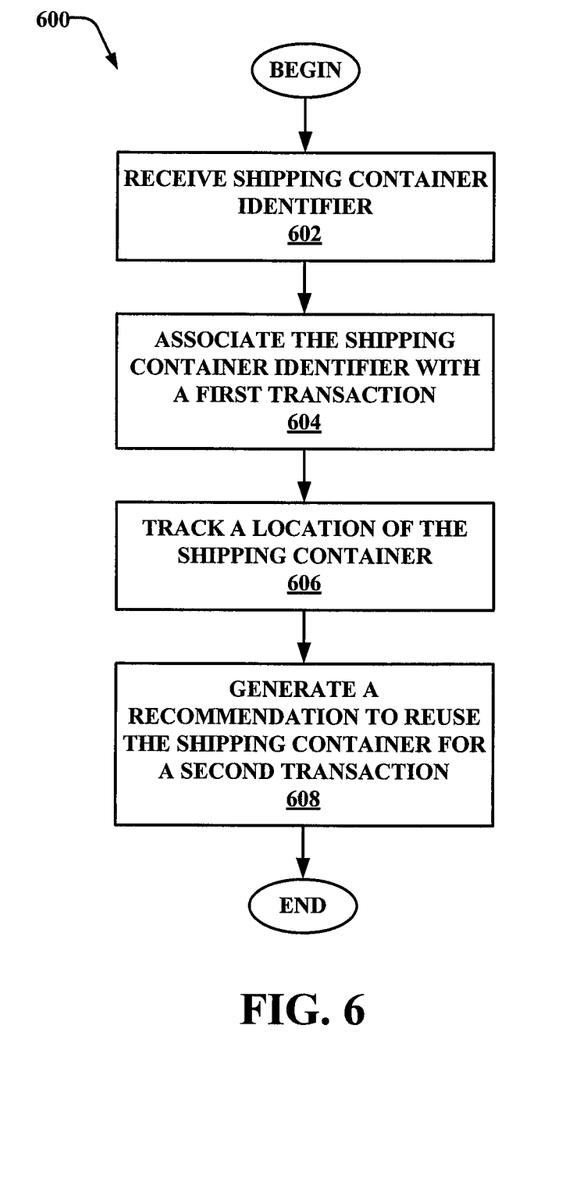
FIG. 6 is a flow chart of one embodiment of a method for generating a recommendation to reuse a shipping container.

FIG. 6 is a flow chart 600 of one embodiment of a method for generating a recommendation to reuse a shipping container. At operation 602, a shipping container identifier of a shipping container is received. The shipping container identifier includes, for example, a unique serial number of a box or packaging item. The unique serial number may be located on the box directly or on a sticker that is affixed to the box.

At operation 604, the shipping container identifier of the shipping container is associated with a first transaction of an online marketplace application. For example, a seller enters the serial number of the box when he/she ships an item related to the first transaction to a buyer. In another embodiment, the seller receives a shipping label from the system in response to entering the serial number. The system keeps track of the shipping label number, the corresponding box serial number, and the corresponding transaction. The transaction may include, for example, a buyer purchasing an item listed from a seller with the online marketplace application.

At operation 606, the location of the shipping container is tracked. In one embodiment, the location of the shipping container is tracked based on the shipping label number. A shipping carrier associated with the shipping label number can update the system in real time as to the location of the shipping container.

At operation 608, a recommendation to reuse the shipping container for a second transaction of the online marketplace application is generated based on a transaction and tracking location history associated with the shipping container identifier. In one embodiment, a storage device stores a database of shipping container identifiers and corresponding transaction and tracking location histories. The transaction history comprises a seller's information, a buyer's information, an item description, and shipping information.

Figure 7:
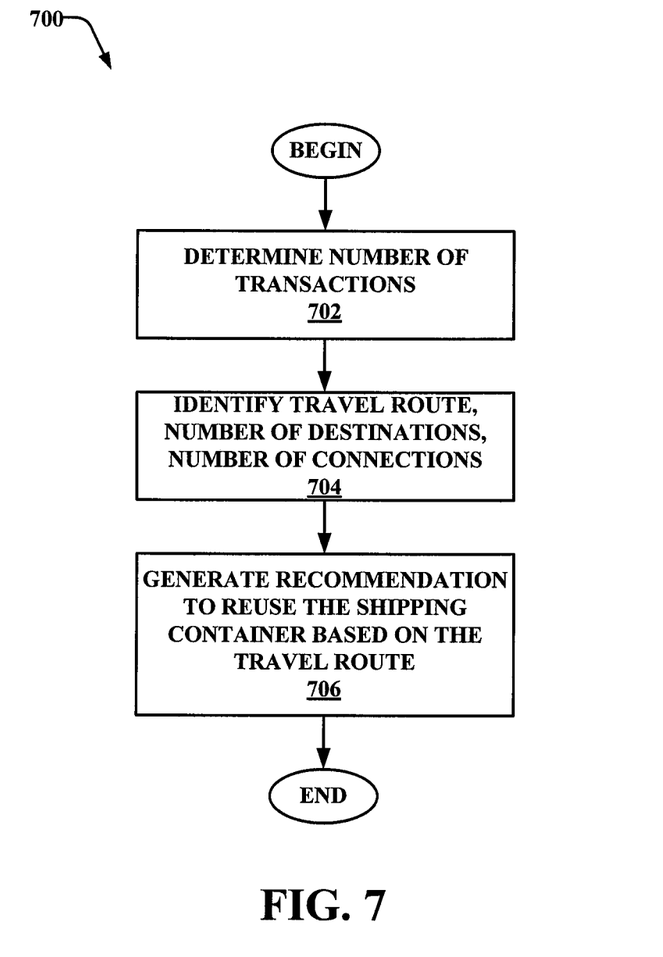
FIG. 7 is a flow chart of another embodiment of a method for generating a recommendation to reuse a shipping container.

FIG. 7 is a flow chart 700 of another embodiment of a method for generating a recommendation to reuse a shipping container. At operation 702, the number of transactions of the online marketplace application associated with the shipping container identifier is determined. For example, a box with a particular serial number may have been involved in a number of transactions. In other words, the same box has been re-used to ship different items in separate transactions.

At operation 704, a travel route, a number of destinations, and a number of connections corresponding to the shipping container are identified based on the shipping container identifier. The travel route may include a travel path on a map of the shipping container. The number of destinations may include the number of times the box has been shipped and received. The number of connections may include the number of times the box has been in transit from one location to another, such as from one shipping warehouse to another shipping warehouse.

At operation 706, a recommendation to reuse the shipping container is generated based on the number of transactions, the travel route, the number of destinations, and the number of connections. In one example, if the shipping container identifier indicates that the shipping container has traveled over an extensive number of destinations, or has a large number of connections, a recommendation to recycle the shipping container may be generated. In another example, if the shipping container has been used less than a number of times (defined, for example, by the number of destinations or the number of connections), a recommendation to reuse the shipping container may be generated. In yet another example, if the shipping container has traveled over an extensive travel route (for example, over a predetermined amount of miles, over a predetermined number of cities, or over a predetermined number of countries), a recommendation to recycle the shipping container may be generated.

Figure 8:
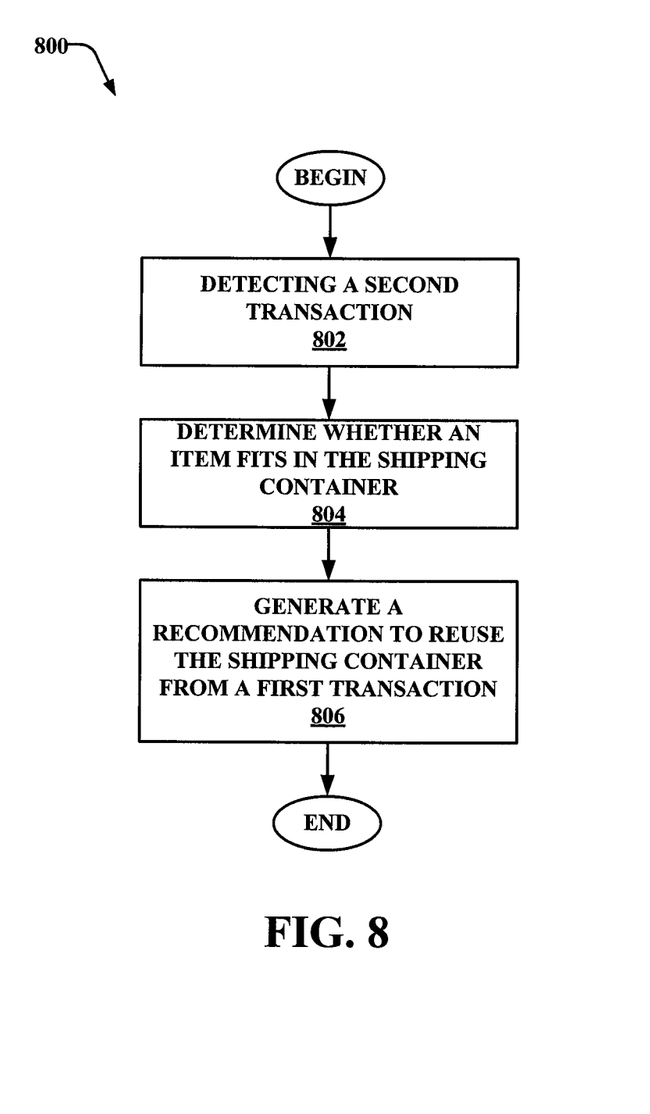
FIG. 8 is a flow chart of another embodiment of a method for generating a recommendation to reuse a shipping container.

FIG. 8 is a flow chart 800 of another embodiment of a method for generating a recommendation to reuse a shipping container. At operation 802, a second transaction where a buyer identified in the first transaction is identified as a seller in the second transaction is detected.

At operation 804, the system determines whether an item identified in the second transaction fits in the shipping container from the first transaction.

The listing from the online marketplace application provides information on the size and weight of an item to be shipped. The system can determine whether the item can fit in the shipping container based on the size and weight of the item and specifications of the box. In one embodiment, the system stores specifications of boxes associated with their corresponding serial numbers. The specification of a box may include, for example, the weight capacity of the box.

At operation 806, a recommendation to reuse the shipping container is generated from the first transaction for the second transaction. If the system determines that the item can fit in the box, the user is now reminded to use the same box that was received in a prior transaction.

In one embodiment, predetermined thresholds to determine whether to reuse the box may be based on the specification of the box, item shipped (how heavy, how large or small), and the distance traveled. For example, a box that is rugged and that has shipped items that are light and small and has traveled a few times may have a higher threshold than a thinner box that has transported large items.

In another embodiment, the box may include and assign an area inside the box where users of the box can write a message to future users of the box.

Figure 9:
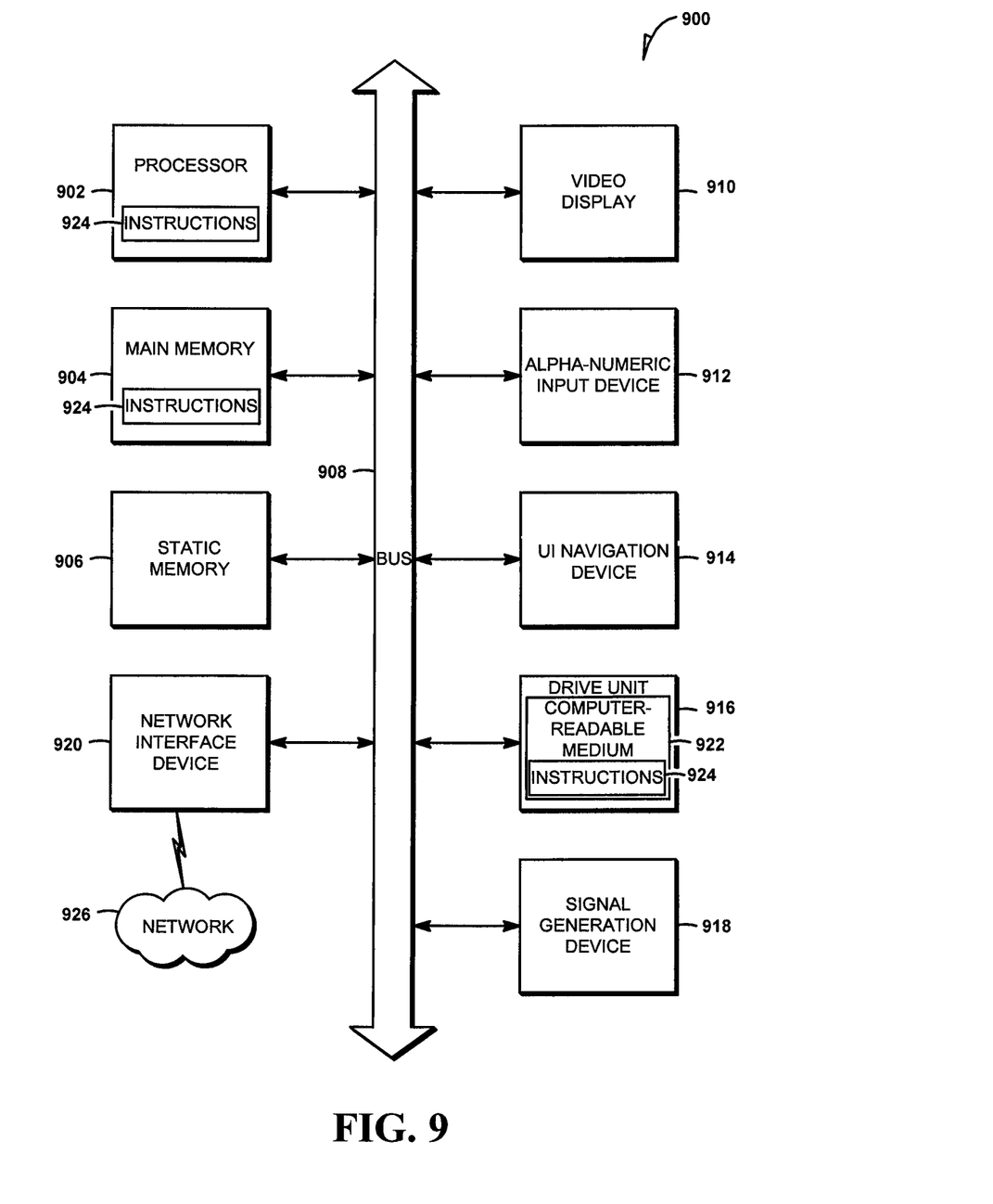
FIG. 9 shows a diagrammatic representation of a machine in the example form of a computer system within which a set of instructions may be executed to cause the machine to perform any one or more of the methodologies discussed herein.

FIG. 9 shows a diagrammatic representation of a machine in the example form of a computer system 900 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a computer-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

The instructions 924 may further be transmitted or received over a network 926 via the network interface device 920 utilizing any one of a number of well-known transfer protocols (e.g., HTTP).

While the computer-readable medium 922 is shown in an example embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the machine and that cause the machine to perform any one or more of the methodologies of the present description or that is capable of storing, encoding or carrying data structures utilized by or associated with such a set of instructions. The term "computer-readable medium" shall accordingly be taken to include, but not be limited to, solid-state memories, optical media, and magnetic media.

What is claimed is:

1. A system, comprising:
 a processor having a shipping container identifier module, an online marketplace interface module, a tracking module, a reuse recommendation engine, a transaction analysis engine, and a tracking location analysis engine,
 the shipping container identifier module configured to receive a shipping container identifier of a shipping container;
 the online marketplace interface module configured to associate the shipping container identifier of the shipping container with a first transaction of an online marketplace application;
 the tracking module configured to track a location of the shipping container;
 the transaction analysis engine configured to determine a number of transactions of the online marketplace application associated with the shipping container identifier;
 the tracking location analysis engine configured to identify a travel route, a number of destinations, and a number of travel connections corresponding to the shipping container based on the shipping container identifier;
 a transaction detection engine configured to detect a second transaction where a buyer identified in the first transaction is identified as a seller in the second transaction; and
 the reuse recommendation engine configured to generate a recommendation to reuse the shipping container for the second transaction of the online marketplace application based on the number of transactions, the travel route, the number of destinations, and the number of connections of the shipping container associated with the shipping container identifier.

2. The system of claim 1, further comprising:
 a storage device comprising a database of shipping container identifiers and corresponding transaction and tracking location histories, wherein the transaction and tracking location history comprises a seller's information, a buyer's information, an item description, and a shipping information.

3. The system of claim 2, wherein the tracking module is configured to track the location of the shipping container based on the shipping information.

4. The system of claim 2, wherein the tracking module further comprises:
 a shipping label module configured to generate a shipping label comprising the shipping information, the shipping label to be affixed on the shipping container; and
 a shipping carrier interface module configured to determine the location of the shipping container based on the shipping label.

5. The system of claim 1, wherein the reuse recommendation engine further comprises:
 a fitting module configured to determine whether an item identified in the second transaction fits in the shipping container from the first transaction.

6. A computer-implemented method comprising:
 receiving a shipping container identifier of a shipping container;
 associating the shipping container identifier of the shipping container with a first transaction of an online marketplace application;
 tracking a location of the shipping container;
 determining a number of transactions of the online marketplace application associated with the shipping container identifier;
 identifying a travel route, a number of destinations, and a number of connections corresponding to the shipping container based on the shipping container identifier;
 detecting a second transaction where a buyer identified in the first transaction is identified as a seller in the second transaction; and
 generating, by a computer system, a recommendation to reuse the shipping container for the second transaction of the online marketplace application based on the number of transactions, the travel route, the number of destinations, and the number of connections of the shipping container associated with the shipping container identifier.

7. The computer-implemented method of claim 6, further comprising:

storing in a storage device, a database of shipping container identifiers and corresponding transaction and tracking location histories, wherein the transaction and tracking location history comprises a seller's information, a buyer's information, an item description, and a shipping information.

8. The computer-implemented method of claim 7, wherein the tracking is based on the shipping information.

9. The computer-implemented method of claim 7, further comprising:
   generating a shipping label comprising the shipping information, the shipping label to be affixed on the shipping container; and
   determining the location of the shipping container based on the shipping label.

10. The computer-implemented method of claim 6, further comprising:
    determining whether an item identified in the second transaction fits in the shipping container from the first transaction.

11. A non-transitory computer-readable storage medium storing a set of instructions that, when executed by a processor, cause the processor to perform operations, comprising:
    receiving a shipping container identifier of a shipping container;
    associating the shipping container identifier of the shipping container with a first transaction of an online marketplace application;
    tracking a location of the shipping container;
    determining a number of transactions of the online marketplace application associated with the shipping container identifier;
    identifying a travel route, a number of destinations, and a number of connections corresponding to the shipping container based on the shipping container identifier;
    detecting a second transaction where a buyer identified in the first transaction is identified as a seller in the second transaction; and
    generating, by a computer system, a recommendation to reuse the shipping container for the second transaction of the online marketplace application based on the number of transactions, the travel route, the number of destinations, and the number of connections of the shipping container associated with the shipping container identifier.

\* \* \* \* \*